Oct. 6, 1953 J. L. DRNEK 2,654,859
MOTOR CONTROL
Filed Dec. 14, 1949 2 Sheets-Sheet 1
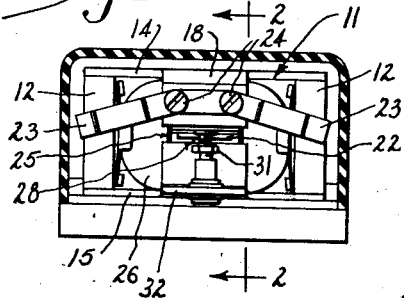
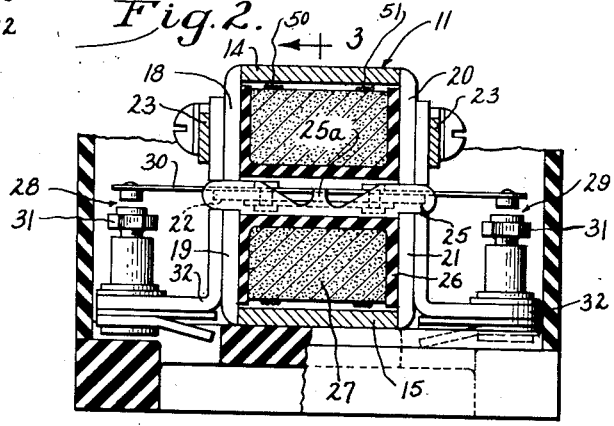
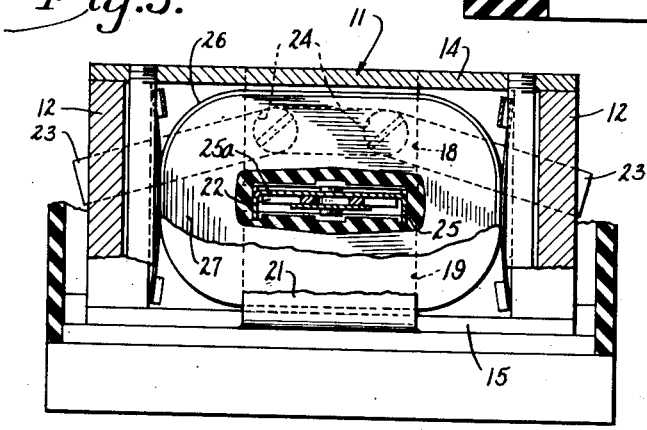
INVENTOR.
John L. Drnek
BY
Carlson, Pitzner, Hubbard & Wolfe
ATTORNEYS Oct. 6, 1953   J. L. DRNEK   2,654,859
MOTOR CONTROL
Filed Dec. 14, 1949   2 Sheets-Sheet 2
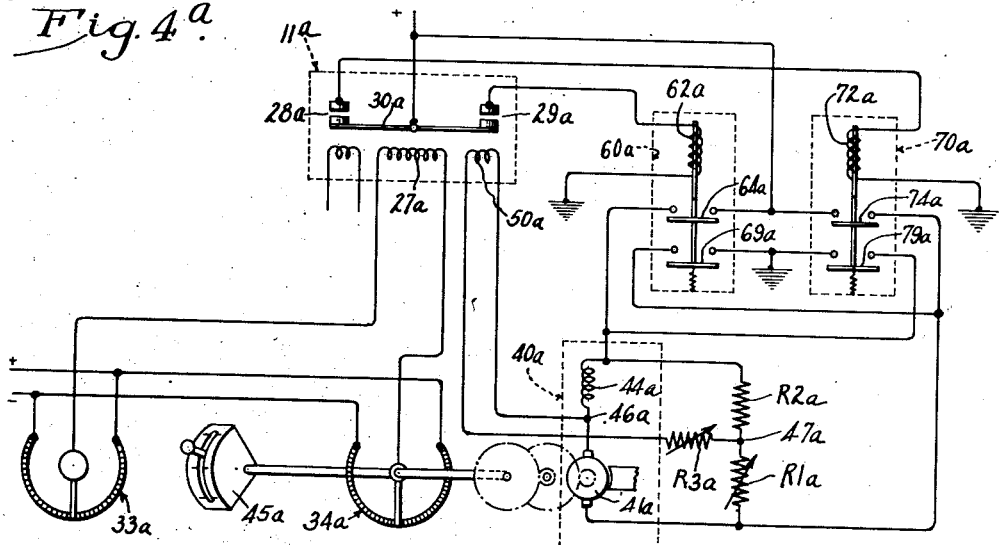
Fig. 4ª.
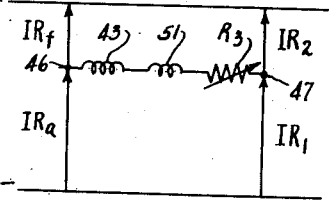
Fig. 5.   Fig. 5ª.
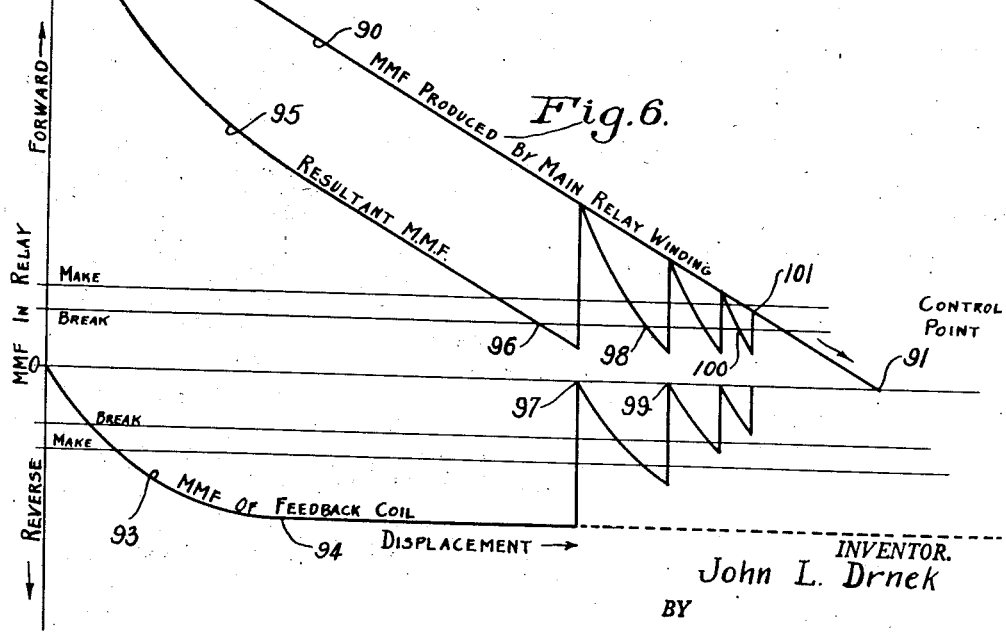
Fig. 6.
INVENTOR.
John L. Drnek
BY
Carlson, Pitzner, Hubbard & Wolfe
ATTORNEYS Patented Oct. 6, 1953

2,654,859

UNITED STATES PATENT OFFICE 2,654,859

MOTOR CONTROL

John L. Drnek, Rockford, Ill., assignor to Barber-Colman Company, Rockford, Ill., a corporation of Illinois Application December 14, 1949, Serial No. 132,903

15 Claims. (Cl. 318—29)

1

The present invention relates to an electrical control device and more particularly to means for quickly and accurately positioning an element driven by an electric motor.

Many industrial and aircraft applications require that an element be positioned to a predetermined point either by remote manual control or automatically in response to a changing condition to enable the condition to be kept at a desired control point. An example of remote manual control is to be found in aircraft where an electric servo motor may be employed for positioning the throttle and other devices requiring frequent adjustment. Where the desired setting must be established with minimum time delay it is sometimes necessary to insert a negative feedback voltage which is a function of motor speed in order to prevent the motor from over-shooting or hunting about the desired control point. In the past this has usually been accomplished by providing an electronic amplifier employing special feedback circuits or by the use of a feedback generator coupled to the positioning device. The use of electronic apparatus or generators is disadvantageous either because the devices are not always reliable or because they add both bulk and expense to the installation.

Accordingly it is an object of the present invention to provide a high speed positioning control for an electric motor which prevents overshooting and hunting about the control point and which at the same time avoids the use of amplifiers and other electronic components for generating the feedback signal. It is a related object to provide a high speed positioning control employing relays and which is capable of responding to small changes in signal voltage, having a sensitivity which compares favorably with delicate electronic circuits.

It is another object of the present invention to provide a positioning control which includes only relays and resistors of commercially available types and which does not require any modification of the electric driving motor. It is an object allied with the foregoing to provide a novel control which is applicable to both the series and shunt types of motors.

It is a further object of the invention to provide a positioning control in which adjustment is effected by means of variable resistors and in which it is possible to accommodate the circuit to a mechanical system having a wide range of speed, torque, inertia, and frictional forces without necessity for frequent readjustment.

It is an object of the invention to provide a

2 high speed positioning control particularly suited for use in aircraft which is of high sensitivity but at the same time capable of controlling appreciable amounts of power. It is still another object to provide a motor control which resists shock and vibration, which is of minimum size and weight, and which is inexpensive to manufacture and maintain.

Other objects and advantages of the invention will become apparent as the discussion proceeds taken in connection with the drawings in which:

Figure 1 is a side elevation of a relay particularly well suited for use in the present invention, the relay casing being shown in section, Fig. 2 is an enlarged sectional view taken substantially along the line 2—2 of Fig. 1, Fig. 3 is a sectional view taken substantially along the line 3—3 of Fig. 2.

Fig. 4 is a schematic wiring diagram of the positioning control arrangement and showing the connections to a reversible electric motor, Fig. 4a is a schematic wiring diagram showing the invention applied to a shunt type of motor employing a permanent magnet field.

Figs. 5 and 5a are diagrammatic representations of the voltages existing in the circuit of Fig. 4 under stalling and running conditions respectively.

Fig. 6 is a characteristic curve showing the manner in which the control point is reached in a typical operating cycle under one condition of adjustment.

While the invention is susceptible of various modifications and alternative constructions, I have shown in the drawings and will herein describe in detail only the preferred embodiments; but it is to be understood that I do not thereby intend to limit the invention to the specific forms disclosed but intend to cover all modifications and alternative constructions falling within the spirit and scope of the invention as expressed in the appended claims.

Referring more particularly to the drawings the invention has been exemplified as applied to a polarized relay of the general type covered in the Bullen and Anderson Patent 2,443,784 which issued June 22, 1948. However, a brief description of the relay may be helpful in understanding the operation of the control circuit to be later discussed. The relay designated generally at 11 comprises a pair of block magnets 12 having a high degree of retentivity. The magnets are spanned by upper and lower bridges 14, 15 which are fixed to the magnets. Inturned from the opposite side edges from each of the bridges 14, 15 are integral ears constituting pairs of opposed pole pieces 18, 19 and 20, 21. The air gaps between the ends of the respective pole pieces are alined with each other on the transverse center line of the stator structure.

The pole pieces are magnetized by the permanent magnets 12. The upper pole pieces 18, 20 may, for example, be north poles and the lower pole pieces south poles. Extending along the transverse center line of the stator and having its ends disposed in the respective ones of the two air gaps noted, is an armature 22. The permanent magnet flux passing between the opposed pairs of pole pieces 18, 19 and 20, 21 sets up forces tending to rock the armature 22 in opposite directions about the latter's transverse center line. Magnetic shunts are provided for equalizing the forces exerted in opposite directions on the armature by the polarizing flux. In this instance the shunts are shown as ferromagnetic strips 23 pivoted at 24 on the upper pole pieces 18 and 20. The outer ends of the shunts 23 resiliently bear against the outer faces of the magnets 12 and by adjusting the shunts about their pivots the polarizing flux forces acting on the armature can readily be equalized. In the present instance the armature itself is comprised of a generally rectangular thin wafer of soft ferromagnetic material and is riveted to the underside of a stamped non-magnetic sheet metal carrier designated generally as 25. This carrier 25 includes narrow lateral projections 25a extending outwardly from its sides along its transverse center line and turned downward at their outer ends. The projections 25a thereon are torsionally flexible, thus permitting rocking movement of the armature 22 about its transverse center line and acting as restoring springs to restore the armature to its centered position illustrated, for example, in Fig. 2.

Supported upon the carrier 25 is an insulating spool 26 through the open center of which the armature and carrier assembly extends. On this spool is wound a main operating winding 27. Upon flow of current in one direction through this winding a magnetomotive force is produced which augments the polarizing flux in the air gap between the armature and diagonally opposite pole pieces and decreases the flux between the armature and the other pole pieces thus tending to rock the armature in one direction. Flow of current through the operating winding in an opposite direction, by a similar action, tends to rotate the armature in an opposite direction.

Two pairs of contacts 28, 29 are provided, the movable contacts being fixed to the end portions of the longitudinally extending contact supporting fingers 30 formed integrally with the carrier 25. The cooperating stationary contacts are mounted on adjusting screws 31 carried on brackets 32 fixed to the outer faces of the lower pole pieces 19 and 21. With the armature in its central or neutral position as shown both pairs of contacts are in the open position.

To actuate the relay the winding thereof may be connected across the output terminals of a Wheatstone bridge type of transmitting and receiving system as shown in Fig. 4 employing two potentiometers, 33 being the transmitting element and 34 the receiver. When the wiper contact of 33 is moved so that a potential difference exists between it and the wiper of 34, a current will flow through the winding 27 causing the closure of the pair of contacts 28 or 29 corresponding to the polarity of the current. The magnitude of the current varies with the amount of departure of the condition from the desired value which in the present case is the discrepancy between the settings of the two potentiometers.

The contacts 28, 29 control current flow to the windings of a reversible electric servo motor 40 which rotates in one direction or the other to move a control element and thus restore the condition to the desired value. In the present instance (Fig. 4) the reversible electric motor 40 has an armature 41 and forward and reverse field windings 42, 43. If desired a brake winding 44 may be included in the armature circuit. The armature, by suitable step-down gearing, serves to position a throttle or other condition controlling device indicated generally at 45.

In accordance with the present invention novel means are provided for supplying to the relay a negative feedback voltage to set up a magnetomotive force in the relay magnetic circuit which varies with the speed of the motor and which acts in opposition to the magnetomotive force set up therein by the main winding 27. The feedback signal is fed to the relay through feedback coils 50, 51. The latter may consist of a few turns of small diameter wire wound about the outside of the main coil as shown in Fig. 2. These coils are so wound that one of them will set up a magnetomotive force in the magnetic circuit in one direction and the other will set up a magnetomotive force in the opposite direction, the two coils being energized alternatively. In practicing the invention means are provided for applying to the appropriate one of the coils a feedback voltage which is substantially zero at the instant that the motor starts up but which builds up substantially as the speed of the motor increases to the full running value. This is accomplished by connecting the appropriate coil to the armature circuit on the one hand and to a source of reference voltage on the other, the value of the latter being such as to cause the feedback to be substantially zero when the motor is started, increasing in the negative feedback direction as the motor comes up to speed. The fixed voltage which is arranged to buck against the variable voltage derived from the armature is provided by a resistor network in the form of a voltage divider R1, R2. It is convenient and helpful to consider the circuit supplying the feedback coils as a bridge with resistors R1 and R3 as one pair of arms and series field 42 (or, alternatively, 43) and the armature as the other pair of arms. The active one of the feedback coils is connected across the bridge "output" terminals.

Prior to discussing the manner in which this bridge circuit operates, attention will first be given to the means which are provided to connect the appropriate one of the feedback coils 50, 51 to the armature circuit. To this end auxiliary relays or contactors 60, 70 are used having coils 62, 72 respectively connected to the contacts of the polarized relay. These relays are preferably of the type in which the closure is practically instantaneous but with a slight delay on drop-out for a purpose which will become clear as the discussion proceeds. Each of the relays has a single pole double-throw switch with the movable elements 64, 74 respectively connected to the field windings 42, 43 of the motor. The stationary contacts 66, 76 are connected to the supply line so that when the relay is energized voltage will be applied to the motor through the appropriate one of the field windings. The relays are further provided with back contacts 68, 78 which are connected to the feedback coils 50, 51 respectively. In this way the deenergized auxiliary relay will cause the associated feedback coil to be connected to the motor circuit. Taking the relay 70 by way of example, it will be noted that when this relay is deenergized the feedback coil 51 is connected through the contacts 74, 78 to the idle field winding 43 of the motor. Since the circuit of the feedback coil does not draw any appreciable amount of current, there will be negligible voltage drop in the winding 43 and the action of the circuit will be the same as though the lead from 74 were connected directly to the common terminal 46 between the armature 41 and field coil 42.

Turning now to the means for supplying the reference voltage it will be noted in Fig. 4 that both of the feedback windings are connected to a terminal 75 which is in turn connected to the mid-point 47 of the voltage divider R1, R2. The lower end of the voltage divider is grounded while the upper end is connected to a source of voltage which is fixed and preferably supplied from the main supply line. In order to remove the voltage from the voltage divider when the motor is turned off, the relays 60, 70 include a pair of auxiliary contacts 69, 79. Interposed between the feedback coils 50, 51 and the voltage divider is a resistor R3 which limits the flow of current and consequently serves as a means for varying the feedback effect.

In practicing the invention the voltage divider is adjusted, preferably by adjusting the value of the resistor R1, so that no voltage will appear across the active feedback coil under "stall" conditions existing at the instant that power is applied to the motor. Thus the feedback effect is zero or near zero when the motor starts and increases as the motor reaches running speed.

The variation in voltage applied to the active feedback coil by the motor upon a change in running speed may be readily appreciated by one skilled in the art by reference to Figs. 5 and 5a. In connection with these figures it will be assumed that relay 60 is energized thus applying line voltage to the motor field 42. The voltages which are significant in the circuit have been represented in the form of vectors, the voltage drop due to current flow through the armature and brake coil 44 being labeled $IR_a$ and that due to current flow through the active field 42, $IR_f$. Likewise the voltage drops due to the current through the resistors in the voltage divider have been labeled $IR_1$ and $IR_2$. As previously mentioned the resistor $R_1$ is adjusted so that the voltage $IR_1$ is equal to $IR_a$ at zero motor speed. Under such conditions the voltages at 46 and 47 are equal and no current will flow through the feedback winding.

However, under running conditions the voltages set forth in Fig. 5a prevail. Because of back E. M. F. or "speed" voltage there is a reduction in both $IR_a$ and $IR_f$, the net result being that the voltage at the point 46 rises. The voltage supplied by the voltage divider meanwhile remains substantially unchanged so that a net voltage $v$ is applied to the feedback coil 51 minus, of course, the drops in the idle field coil 43 and in the series resistor R3. This voltage $v$ will be in such a direction as to set up a magnetomotive force in the relay 11 which opposes the magnetomotive force produced by the main winding 27. However since the speed of the motor is limited, the speed voltage will also be limited and the voltage $v$ applied to the feedback coil will not exceed a predetermined maximum.

While the operation of the circuit shown in Fig. 4 will be apparent from the foregoing it will be helpful to summarize it for a typical stop made under one condition of adjustment of the resistor R3. In order that the operation may be described step by step reference is made to Fig. 6 which shows the magnetomotive force set up in the main relay as a function of the rotational displacement of the motor 40. It will be assumed in this discussion that movement of the throttle 45 is accompanied by movement of wiper in the potentiometer 34 such that the voltage applied to the main winding of the relay 11 is gradually reduced as the motor rotates into the control position. For simplicity the variation of the magnetomotive force produced by the main winding 27 will be taken to be linear and is disclosed in Fig. 6 as the straight line 90. Starting at 92 this line crosses the horizontal axis at a point 91 which is the control point at which the signal to the main winding 27 is zero and at which the motor 40 should come to a stop. Fig. 6 also shows (see curve 93) the variation in magnetomotive force produced by the active one of the feedback coils (which in this case will be assumed to be the coil 51) over the operating cycle.

It will be assumed that a change takes place in the control potentiometer 33 which causes the main signal voltage to be applied to the main winding 27 with the direction of the unbalance such as to cause closure of the contacts 28 and energization of the auxiliary relay 60. R3 is adjusted to produce considerable feedback. Operation of the relay 60 causes the contacts 64, 66 to be "made" applying line voltage to the field winding 42 of the motor. Simultaneously closure of the contacts 69 applies voltage to the upper end of the voltage divider R1, R2. At the instant that the motor starts to rotate the magnetomotive force produced by the active feedback coil 51 is zero since the current therethrough is zero while the magnetomotive force produced by the main winding 27 is at the high value 92. However, as the motor accelerates the magnetomotive force of the feedback winding will build up and level off at a value 94, the actual magnitude being dependent upon the adjustment of the resistor R3. Adding the M. M. F.'s produces the resultant which varies in accordance with the curve 95.

As the motor 40 rotates, the condition which initiated the unbalance is gradually corrected and the difference between the main and feedback magnetomotive forces finally is low enough at point 96 to release the contacts 28. Since the contactor 60 is preferably so designed that it does not open instantaneously, slight additional rotation of the motor will occur before the contactor opens the motor circuit. Voltage is thereupon removed from both terminals of the feedback coil 51 and the magnetomotive force produced thereby drops to zero as indicated at 97. Since the magnetomotive force of the main winding 27 is thus no longer opposed it will again be effective to cause closure of the relay and the motor will again start to move in the direction of the control point 91. As the motor accelerates the magnetomotive force set up by the feedback coil 51 will again increase until the drop-out point 98 is reached. This point is reached before the motor has an opportunity to come up to full running speed. Since the drop-out of contactor 60 is delayed, the motor will overtravel somewhat, the feedback coil being deenergized as indicated at 99. Removal of the bucking magnetomotive force again causes the magnetomotive force in the main winding to be effective to close the relay contacts 28 so that the motor is started.

This process is repeated until the position of the receiving potentiometer 34 is so close to the control point 91 that there is no longer sufficient voltage to operate the relay. This defines the so-called "dead band" in the immediate vicinity of the control point. It is important to note, however, that the motor does not stop immediately upon deenergization of the relay 11. Continued energization of the motor beyond the point 100 by the active contactor causes the potentiometer 34 to be eased to within a very short distance of the control point. The amount of time delay required in the contactors 69, 70 to accomplish this will depend upon a number of factors, primarily the inertia of the motor drive. Preferably the contactors should be of the type in which the time delay is adjustable and adjustment for accurate positioning under practical operating conditions is well within the capabilities of one skilled in the art.

To facilitate understanding the foregoing analysis has assumed a negative feedback higher than optimum (caused by setting the series resistor R3 to a fairly low value), the motor being "inched" into position in a series of short increments. Where R3 is adjusted to the opposite extreme, in which the amount of feedback is small, hunting and overtravel may take place about the desired control point. However, when R3 is properly set it will be found that the motor will run its load right up to the desired position or control point without a preliminary stop and without overtravel. If desired this adjustment and that pertaining to drop-out time may be made alternately in small increments and once set periodic readjustment is unnecessary.

*Use of control circuit with shunt type motor*

That the invention disclosed herein is also applicable to D. C. motors other than the series field type will be apparent upon an inspection of the arrangement shown in Fig. 4a which includes a "shunt" type of reversing motor employing permanent magnets for the field. The motor is indicated at 40a and circuit components which are similar to those set forth in Fig. 4 have been designated with the same reference numeral with the addition of the subscript *a*. The circuit is basically quite similar to that of Fig. 4 except that here there are no series windings and the brake coil 44a connected in series with the motor armature is employed to obtain the variable voltage drop used for feedback purposes. The latter is obtained from the terminal 46a and applied to the feedback coil 50a. As before the reference voltage is obtained from a voltage divider at the common terminal 47a.

It is to be particularly noted that only a single feedback coil 50a need be used in this embodiment regardless of whether the motor is turning in the forward or reverse direction, the coil being permanently connected to the output terminals of the bridge circuit. The above is accomplished in the present embodiment by reversing the polarity of the reference voltage obtained from terminal 47a in the voltage divider simultaneously with a reversal of the voltage applied to the armature circuit of the motor. Referring to Fig. 4a the armature circuit is connected so that it may be supplied with voltage of direct or reversed polarity depending upon which of the relays 60a, 70a is energized, and the voltage divider circuit R1, R2 is connected directly in parallel therewith. It will be apparent therefore upon closure of the contacts 28a relay 70a will close causing positive voltage to be applied to the lower end of the armature circuit and negative voltage to the upper end. This will result in rotation of the motor in such direction as to adjust the potentiometer 34a to a new null position meanwhile repositioning the throttle control. The negative feedback M. M. F. will be generated in the relay 11a just as in the case of the embodiment previously discussed and as set forth in the diagram of Fig. 6. Similarly, closure of the contacts 29a will cause movement of the throttle in the opposite direction, and since the voltage is simultaneously reversed in sense in the feedback coil 50a, this coil will again be effective in producing stable positioning of the throttle rapidly yet without any tendency toward overtravel.

If desired in Fig. 4a a resistor may be substituted for the brake coil. Such resistor should have approximately the same resistance as a conventional brake winding although the resistance should, in any event, be small enough so that the voltage drop across it under normal running conditions will be a small fraction of the total voltage available to the motor. Such substitution is entirely practical since the stabilization effected by the present arrangement is of such high order that a brake is not justified except in the case of fairly large inertia loads.

In the following claims the term "resistance" refers not only to a separate resistor but also includes the resistance which may be inherent in a brake or field winding and of which use is made in the two embodiments disclosed herein.

I claim as my invention:

1. In a device for controlling a condition, the combination comprising a polarized relay having a main winding, means for applying voltage to said main winding in one direction or the other in accordance with the departure of the condition from a desired value, a condition controlling member, an electric motor for positioning said condition controlling member, said motor having an armature and a resistance in series therewith, said resistance providing a source of voltage which varies in accordance with the speed of the motor, means including contacts controlled by said relay for causing rotation of the motor in a direction to correct said condition, said relay having a feedback coil therein connected to said variable voltage source for excitation in a direction to oppose the effect of the main winding on said relay, and a source of reference voltage for said feedback coil for bucking said variable voltage and of such magnitude that under stall conditions there is substantially no feedback effect.

2. In a device for controlling a condition, the combination comprising a polarized relay having a main winding, means for applying voltage to said main winding in one direction or the other in accordance with the departure of the condition from a desired value, a condition controlling member, an electric motor for positioning said condition controlling member, said motor having an armature and a resistance in series therewith, said resistance providing a source of voltage which varies in accordance with the speed of the motor, means including contacts controlled by said relay for causing rotation of the motor in a direction to correct said condition, said relay having a feedback coil therein connected to said variable voltage source for excitation in a direction to oppose the effect of the main winding on said relay, a source of reference voltage for said feedback coil for bucking said variable voltage and of such magnitude that under stall conditions there is substantially no current flow therein, and means including a series resistor in the circuit of said feedback coil for limiting the current flow therein as the motor is brought up to speed.

3. In a device for controlling a condition, the combination comprising a polarized relay having a main winding and having first and second contacts operated upon applying voltage to the main winding which is of direct and reverse polarity, respectively, means for applying voltage to said main winding in one direction or the other in accordance with the departure of the condition from a desired value, a condition controlling member, a Wheatstone bridge circuit, said circuit having a pair of input terminals and a pair of output terminals, one of the legs of said bridge comprising an electric motor for positioning said condition controlling member and the remaining legs being made up of resistances, means connected to said relay contacts for applying voltage to said input terminals with such polarity as to cause said motor to rotate in a direction to correct said condition, a stabilizing feedback coil in said relay and connected across the output terminals of the bridge so that the coil is energized in a direction to oppose the effect of the main relay winding, and means for making the bridge circuit substantially balanced under stalled motor conditions.

4. In a device for controlling a condition, the combination comprising a polarized relay having a main winding, means for applying voltage to said main winding in one direction or the other in accordance with the departure of the condition from a desired value, a condition controlling member, an electric motor for positioning said condition controlling member and having a series field winding, means including contacts controlled by said relay for causing said motor to rotate in a direction to correct said condition, a stabilizing feedback coil in said relay, and a circuit associated with said motor for energizing said feedback coil, said circuit including resistances comprising two legs of a Wheatstone bridge and so connected to the motor that the armature and series field thereof form the third and fourth legs, the output terminals of said bridge being connected to said feedback coil for energizing the same in a direction to oppose the effect of the main relay winding, and means for adjusting the bridge circuit so that substantially no current flows in the feedback coil under stalled motor conditions.

5. In a device for controlling a condition, the combination comprising a single pole double-throw polarized relay having a main winding, means for supplying voltage to said main winding with a magnitude and direction which depends upon the desired change in said condition, a condition controlling member, an electric motor of the series type having field windings for forward and reverse rotation for positioning said member at a desired control point, means including contacts controlled by said relay for supplying voltage to said motor through one or the other of said motor field windings to cause rotation of the motor in a direction to effect the desired change in said condition, said relay having first and second feedback coils thereon, means including a voltage divider for supplying an adjustable reference voltage, and means including contacts actuated by said relay for connecting one of said feedback coils to the unused one of said motor field windings and to said source of reference voltage so that a feedback magnetomotive force is set up in said relay which increases with the speed of the motor and is in a direction to oppose the magnetomotive force of the main relay winding thereby to reduce the tendency of the motor to overtravel beyond the control point.

6. In a device for controlling a condition, the combination comprising a single pole double-throw polarized relay having a main winding, means for supplying voltage to said main winding in one direction or the other in accordance with the departure of the condition from a desired value, a condition controlling member, an electric motor of the series type having field windings for forward and reverse rotation for positioning said member at a desired control point, means including contacts controlled by said relay for supplying voltage to said motor through one or the other of said motor field windings to cause rotation of the motor in a direction to correct said condition, said relay having first and second feedback coils thereon, means for supplying a bucking voltage, and means including contacts actuated by said relay for connecting one of said feedback coils to the unused one of said motor field windings and to said source of bucking voltage so that a feedback magnetomotive force is set up in said relay which is substantially zero under conditions of stall but which builds up in a direction to oppose the magnetomotive force of the main relay winding under running conditions to reduce the tendency of the motor to overtravel beyond the control point.

7. In a device for controlling a condition, the combination comprising a single pole double-throw polarized relay having a main winding, means for supplying voltage to said main winding which is of a polarity and magnitude corresponding to a desired change in the condition, a condition controlling member, an electric motor of the series type having field windings for forward and reverse rotation for positioning said members at a desired control point, means including contacts controlled by said relay for supplying voltage to said motor through one or the other of said motor field windings to cause rotation of the motor in a direction to correct said condition, said relay having feedback coil means therein for setting up a stabilizing magnetomotive force, a source of reference voltage, and means including contacts actuated by said relay for connecting said feedback coil means to the unused one of said motor field windings and to said source of reference voltage so that a magnetomotive force is set up in said relay which increases with the speed of the motor and is in a direction to oppose the magnetomotive force of the main relay winding to reduce the tendency of the motor to overtravel beyond the control point.

8. A high speed positioning control adapted to be energized from an external source of potential which varies in proportion to the departure of a condition in one direction or the other from a desired value and for connection to a reversible electric motor having forward and reverse series windings, the combination comprising a polarized relay having a main winding for connection to said source of control voltage and having contacts operatively associated therewith for supplying power to an appropriate one of said series field windings to cause said motor to rotate in one direction or the other as required to restore the condition to the desired value, means including a negative feedback winding on said polarized relay for opposing the effect of the main winding and arranged for energization by the motor circuit, and means including a voltage divider having provision for adjusting the same and connected to said feedback winding for producing a reference voltage which substantially neutralizes the voltage from the motor under stall conditions but which is overcome under running conditions so that the relay is deenergized prior to the motor reaching the control point.

9. In a device for controlling a condition, the combination comprising a source of voltage which varies in magnitude and direction in accordance with the departure of the condition from a predetermined value, a single pole double-throw polarized relay having a main winding connected to said source of voltage, a motor having forward and reverse series windings, forward and reverse auxiliary relays having their windings connected to the contacts of said polarized relay respectively and having contacts for applying voltage to the respective field windings in the motor for rotating the motor in one direction or the other, forward and reverse feedback windings on said polarized relay capable of setting up a magnetomotive force in said polarized relay which is in a direction to oppose the magnetomotive force set up by the main winding therein, means including a voltage divider for supplying a bucking voltage, said auxiliary relays having contacts for connecting the associated feedback winding to the unenergized field winding of the said motor and to the source of bucking voltage, means for adjusting the voltage divider so that the bucking voltage is substantially equal to the voltage derived from the motor under stall conditions but of unlike magnitude under running conditions so that the main control voltage is overcome and the polarized relay deenergized prior to the arrival of the motor at the control point.

10. In a device for controlling a condition, the combination comprising a single pole double-throw polarized relay having a main winding, means for applying voltage to said main winding in one direction or the other in accordance with the departure of a condition from a desired value, a condition controlling member, a circuit including an electric motor for positioning said member and including a resistance in series therewith, said resistance being arranged to provide a terminal having a potential which varies in accordance with the speed of the motor, means including contacts controlled by said relay for applying voltage to said motor circuit to cause rotation of the motor in a direction to correct said condition, a voltage divider resistance connected in parallel across said motor circuit and providing a terminal having a reference potential, said relay having a feedback coil thereon connected across said terminals, and means for adjusting at least one of said resistances so that substantially no current flows through said feedback coil under stall conditions with an increasing current as the motor comes up to speed.

11. In a device for controlling a condition, the combination comprising a single pole double-throw polarized relay having a main winding, means for applying voltage to said main winding in one direction or the other in accordance with the departure of a condition from a desired value, a condition controlling member, a circuit including an electric motor for positioning said member, and a resistance in series therewith, said resistance being arranged to provide a terminal having a potential which varies with the speed of the motor, means including forward and reverse contactors arranged for energization by said relay for supplying voltage to said motor circuit to cause rotation of the motor in a direction to correct said condition, a voltage divider connected in parallel across said motor circuit and providing a terminal having a reference potential, said relay having a feedback coil thereon connected across said terminals, means for adjusting at least one of said resistances so that substantially no current flows through said feedback coil under stall conditions with an increasing current as the motor comes up to speed, and means to adjust the voltage applied to said feedback coil under running conditions to vary the negative feedback effect and to accomplish rapid positioning at the control point with a minimum of overtravel.

12. In a device for controlling a condition, the combination comprising, a single pole double-throw polarized relay having a main winding, means for applying voltage to said main winding with a polarity and magnitude which depends upon the difference between the existing condition and the desired condition, a condition controlling member, an electric motor of the shunt type for positioning said condition controlling member, said motor having an armature and a resistance in series therewith, said resistance providing a source of stabilizing voltage which varies in accordance with motor speed, means including contacts controlled by said relay for causing voltage of one polarity or another to be applied to said motor circuit to produce rotation of the motor in a direction to correct said condition, said relay having a feedback coil thereon connected to said source of stabilizing voltage for excitation in a direction to oppose the effect of the main winding on said relay, and a source of reference voltage for said feedback coil such that under conditions of standstill there is minimum feedback effect.

13. In a device for controlling a condition, the combination comprising, means for generating a voltage which is proportional in magnitude and polarity to a departure of the condition from a desired value, a polarized relay having a main winding, a source of line voltage, a motor circuit including an armature and a resistance in series therewith providing a terminal whose potential varies in accordance with the motor speed, a condition controlling member driven by said motor, means including contacts controlled by said relay for applying line voltage of such polarity to said motor that rotation of the same takes place in a direction to restore said condition to the desired value, a voltage divider resistance connected in parallel with said motor circuit and providing a terminal of reference voltage, a stabilizing feedback coil in said relay connected across said terminals and polarized to oppose the effect of the main winding, at least one of said resistances having provision for adjustment so that the bucking effect of the feedback coil increases as the motor speed increases from the initial stalled condition.

14. In a device for controlling a condition, the combination comprising a single pole double-throw polarized relay having a main winding, means for applying voltage to the main winding of a magnitude and direction which is representative of the degree of departure of the condition from a desired value, a condition controlling member, an electric motor for positioning said condition controlling member, a feedback coil in said relay, means for generating a feedback voltage which varies from substantially zero under stalled motor conditions increasing with the speed of the motor, and contactors arranged to be energized alternatively by the relay and including contacts for energizing the motor for rotation in a direction to bring about corrective movement of the condition controlling member, said contactors having a time delay on drop-out so that the motor is energized for a short interval after the opening of the contacts on the polarized relay.

15. In a device for controlling a condition, the combination comprising, a polarized relay having a main winding, means for applying voltage to said main winding in one direction or the other in accordance with the departure of the condition from a desired value, a condition controlling member, an electric motor for positioning said condition controlling member, said motor having an armature and a resistance in series therewith, said resistance providing a source of voltage which varies in accordance with the speed of the motor, means including contacts controlled by said relay for causing rotation of the motor in a direction to correct said condition, and a source of bucking voltage, said relay having feedback coil means connected to the variable voltage source and to said source of bucking voltage with the voltages so polarized and of such magnitude that under running conditions a magnetomotive force is set up in the relay which bucks the magnetomotive force set up by the main winding while under stall conditions substantially no bucking magnetomotive force is produced.

JOHN L. DRNEK.

References Cited in the file of this patent

UNITED STATES PATENTS

| Number | Name | Date |
|---|---|---|
| 1,339,930 | Henderson | May 11, 1920 |
| 1,971,313 | Johnson | Aug. 21, 1934 |
| 2,109,776 | Johnson | Mar. 1, 1938 |
| 2,113,436 | Williams, Jr. | Apr. 5, 1938 |
| 2,115,834 | Young | May 3, 1938 |
| 2,119,061 | Stein et al. | May 31, 1938 |
| 2,263,497 | Harrison | Nov. 18, 1941 |
| 2,277,653 | Evans | Mar. 24, 1942 |
| 2,383,942 | Patin | Sept. 4, 1945 |
| 2,443,784 | Bullen et al. | June 22, 1948 |
| 2,460,276 | Bernas | Feb. 1, 1949 |